(12) United States Patent
Diar Bakerly et al.

(10) Patent No.: US 10,414,984 B2
(45) Date of Patent: Sep. 17, 2019

(54) SYNERGISTIC FLAME RETARDANT COMPOSITIONS AND USES THEREOF IN POLYMER COMPOSITES

(71) Applicant: Martinswerk GmbH, Bergheim (DE)

(72) Inventors: Bashar Diar Bakerly, Cologne (DE); Martijn Jacobus Marinus Mies, Eindhoven (NL); Thomas Olaf Dittmar, Cologne (DE)

(73) Assignee: Martinswerk GmbH, Bergheim (DE)

( * ) Notice: Subject to any disclaimer, the term of this patent is extended or adjusted under 35 U.S.C. 154(b) by 29 days.

(21) Appl. No.: 15/784,362

(22) Filed: Oct. 16, 2017

(65) Prior Publication Data
US 2018/0105751 A1   Apr. 19, 2018

Related U.S. Application Data

(60) Provisional application No. 62/409,409, filed on Oct. 18, 2016.

(51) Int. Cl.
| | |
|---|---|
| *C09K 21/02* | (2006.01) |
| *C08K 3/18* | (2006.01) |
| *C08K 3/22* | (2006.01) |
| *C08K 3/26* | (2006.01) |
| *C08K 3/34* | (2006.01) |
| *C08K 9/04* | (2006.01) |
| *C08L 31/04* | (2006.01) |
| *C08L 23/08* | (2006.01) |

(52) U.S. Cl.
CPC ............... *C09K 21/02* (2013.01); *C08K 3/18* (2013.01); *C08K 3/22* (2013.01); *C08K 3/26* (2013.01); *C08K 3/346* (2013.01); *C08K 9/04* (2013.01); *C08L 23/0853* (2013.01); *C08L 31/04* (2013.01); *C08K 2003/2224* (2013.01); *C08K 2003/267* (2013.01)

(58) Field of Classification Search
CPC . C09K 21/02; C08K 3/18; C08K 3/22; C08K 3/26; C08K 3/346; C08K 9/04; C08K 2003/2224; C08K 2003/267; C08L 23/0853; C08L 31/04
USPC ........................................................ 524/413
See application file for complete search history.

(56) References Cited

U.S. PATENT DOCUMENTS

| | | | |
|---|---|---|---|
| 5,017,637 A | 5/1991 | Smith et al. | |
| 5,218,027 A | 6/1993 | Smith et al. | |
| 6,281,164 B1 | 8/2001 | Demmel | |
| 6,344,158 B1 | 2/2002 | Schlosser et al. | |
| 6,547,992 B1 | 4/2003 | Schlosser et al. | |
| 6,756,430 B2 | 6/2004 | Matsuda et al. | |
| 6,780,914 B2 | 8/2004 | Jung et al. | |
| 7,514,489 B2 | 4/2009 | Granada, Jr. et al. | |
| 7,737,364 B2 | 6/2010 | Park et al. | |
| 7,759,580 B2 | 7/2010 | Park et al. | |
| 8,071,224 B2 | 12/2011 | Iwasaki | |
| 8,703,288 B2 | 4/2014 | Clancy | |
| 2004/0241110 A1 | 12/2004 | Lee | |
| 2007/0176155 A1 | 8/2007 | Granada, Jr. et al. | |
| 2007/0179223 A1 | 8/2007 | Hiroshige | |
| 2008/0085969 A1 | 4/2008 | Itoh | |
| 2009/0053466 A1 | 2/2009 | Alur et al. | |
| 2010/0285313 A1 | 11/2010 | Zhang et al. | |
| 2011/0288210 A1 | 11/2011 | Pinnavaia et al. | |
| 2012/0010346 A1 | 1/2012 | La Rosa et al. | |
| 2013/0245169 A1 | 9/2013 | Henze et al. | |
| 2013/0245170 A1 | 9/2013 | Henze et al. | |
| 2014/0171567 A1 | 6/2014 | Guo et al. | |
| 2014/0171575 A1 | 6/2014 | Mercx et al. | |
| 2014/0213712 A1 | 7/2014 | Bolourchi et al. | |
| 2015/0004343 A1 | 1/2015 | Levchick et al. | |
| 2015/0166769 A1 | 6/2015 | Henze et al. | |
| 2015/0284537 A1 | 10/2015 | Henze et al. | |

FOREIGN PATENT DOCUMENTS

| | | |
|---|---|---|
| CA | 2132599 | 3/1996 |
| CN | 1405112 A | 3/2003 |
| CN | 101172870 A | 5/2008 |
| CN | 101696326 A | 4/2010 |
| CN | 102321374 A | 1/2012 |
| CN | 103803885 A | 5/2014 |
| CN | 104163597 A | 11/2014 |
| EP | 0 331 358 A2 | 2/1989 |
| EP | 0 333 514 | 9/1989 |
| EP | 2 915 848 | 9/2015 |
| JP | 2000144581 A2 | 5/2000 |
| JP | 2005225991 A2 | 8/2005 |
| JP | 2007016143 A2 | 1/2007 |
| JP | 2014095068 A2 | 9/2013 |
| WO | WO 2013/085788 A1 | 6/2013 |
| WO | WO 2014/004995 A2 | 1/2014 |
| WO | WO 2014/036720 A1 | 3/2014 |
| WO | WO 2014/184429 A1 | 11/2014 |
| WO | WO-2014184429 A1 * | 11/2014 ............... C08K 3/22 |

OTHER PUBLICATIONS

International Search Report and the Written Opinion of the International Searching Authority in PCT/EP2017/076368 dated Apr. 18, 2018, 11 pages.

* cited by examiner

*Primary Examiner* — Ling Siu Choi
*Assistant Examiner* — Ronald Grinsted
(74) *Attorney, Agent, or Firm* — Merchant & Gould P.C.

(57) ABSTRACT

Flame retardant compositions containing an inorganic flame retardant, such as aluminum trihydrate or magnesium hydroxide, and a flame retardant synergist containing hydrotalcite and clay at a weight ratio of hydrotalcite:clay ranging from 1:1 to 100:1, are disclosed. These flame retardant compositions can be used to produce polymer formulations with a unique balance of flame retardant, mechanical, and rheological properties.

23 Claims, 10 Drawing Sheets

SYNERGISTIC FLAME RETARDANT COMPOSITIONS AND USES THEREOF IN POLYMER COMPOSITES

REFERENCE TO RELATED APPLICATION

This application claims the benefit of U.S. Provisional Application Ser. No. 62/409,409, filed on Oct. 18, 2016, the disclosure of which is incorporated herein by reference in its entirety.

BACKGROUND OF THE INVENTION

The present invention is directed generally to flame retardant compositions containing an inorganic flame retardant and a flame retardant synergist containing hydrotalcite and clay. These flame retardant compositions can be used in polymer formulations to produce products having a unique combination of mechanical, rheological, and flame retardant properties.

SUMMARY OF THE INVENTION

This summary is provided to introduce a selection of concepts in a simplified form that are further described below in the detailed description. This summary is not intended to identify required or essential features of the claimed subject matter. Nor is this summary intended to be used to limit the scope of the claimed subject matter.

A flame retardant composition in accordance with aspects of this invention can contain from about 75 wt. % to about 99.5 wt. % of an inorganic flame retardant comprising aluminum trihydrate and/or magnesium hydroxide, and from about 0.5 wt. % to about 25 wt. % of a flame retardant synergist. The flame retardant synergist can contain a hydrotalcite and a clay at a weight ratio of hydrotalcite:clay in a range from about 1:1 to about 100:1.

Polymer compositions also are provided herein, and such compositions can comprise a polymer and any of the flame retardant compositions disclosed herein. Generally, the weight ratio of polymer:flame retardant composition ranges from about 50:50 to about 25:75. These polymer compositions can have an unexpected combination of excellent mechanical, rheological, and flame retardant properties.

Both the foregoing summary and the following detailed description provide examples and are explanatory only. Accordingly, the foregoing summary and the following detailed description should not be considered to be restrictive. Further, features or variations may be provided in addition to those set forth herein. For example, certain aspects may be directed to various feature combinations and sub-combinations described in the detailed description.

DEFINITIONS

Figure 1:
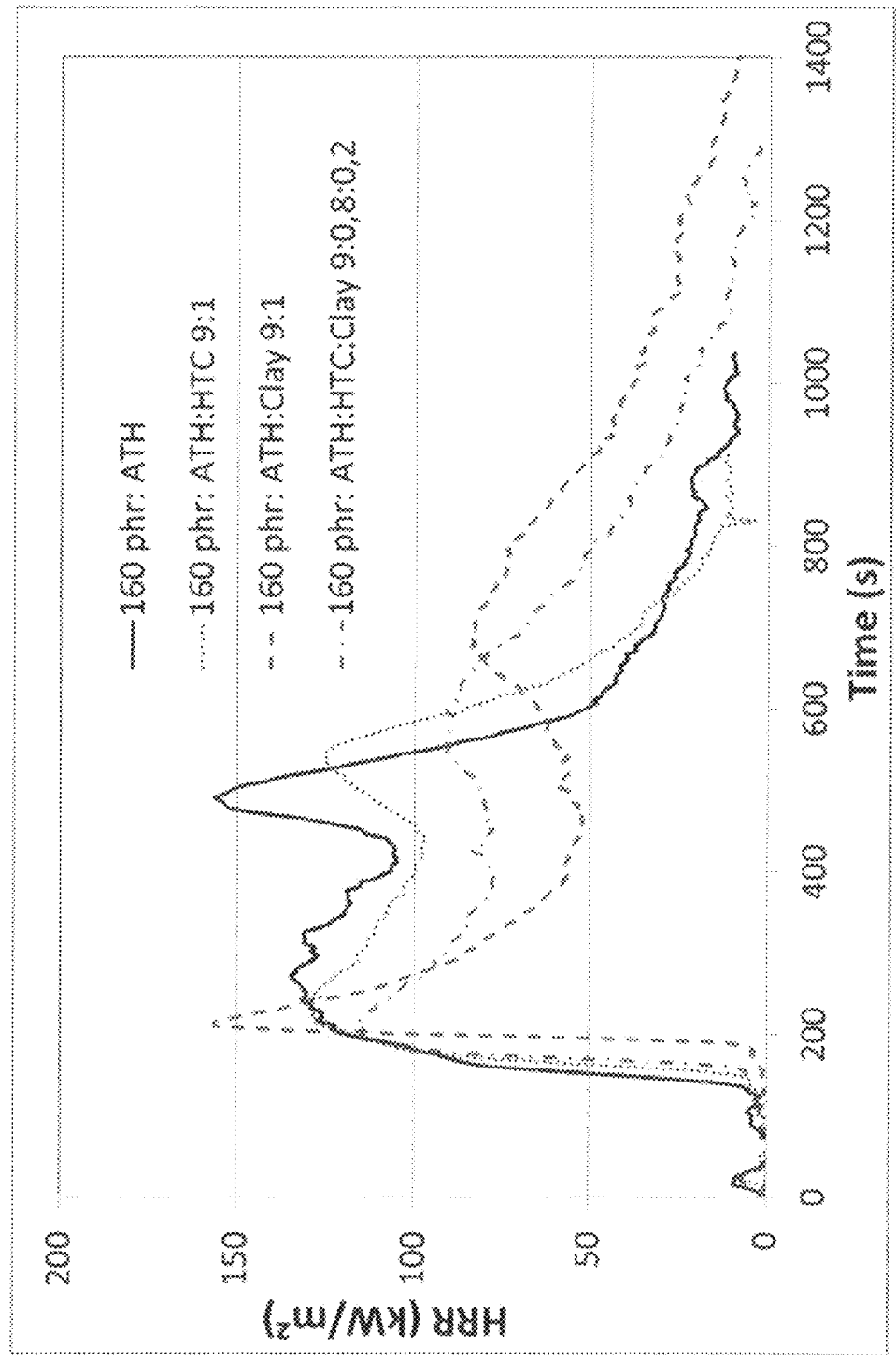
FIG. 1 presents plots of the heat release rate (HRR) curves for the flame retardant polymer compositions of Example 1.

To define more clearly the terms used herein, the following definitions are provided. Unless otherwise indicated, the following definitions are applicable to this disclosure. If a term is used in this disclosure but is not specifically defined herein, the definition from the IUPAC Compendium of Chemical Terminology, 2nd Ed (1997), can be applied, as long as that definition does not conflict with any other disclosure or definition applied herein, or render indefinite or non-enabled any claim to which that definition is applied. To the extent that any definition or usage provided by any document incorporated herein by reference conflicts with the definition or usage provided herein, the definition or usage provided herein controls.

Herein, features of the subject matter are described such that, within particular aspects, a combination of different features can be envisioned. For each and every aspect and each and every feature disclosed herein, all combinations that do not detrimentally affect the designs, compositions, processes, or methods described herein are contemplated and can be interchanged, with or without explicit description of the particular combination. Accordingly, unless explicitly recited otherwise, any aspect or feature disclosed herein can be combined to describe inventive designs, compositions, processes, or methods consistent with the present disclosure.

While compositions and methods are described herein in terms of "comprising" various components or steps, the compositions and methods can also "consist essentially of" or "consist of" the various components or steps, unless stated otherwise. For example, polymer compositions consistent with aspects of the present invention can comprise; alternatively, can consist essentially of; or alternatively, can consist of; (1) a polymer, and (2) a flame retardant composition.

The terms "a," "an," and "the" are intended to include plural alternatives, e.g., at least one, unless otherwise specified.

Generally, groups of elements are indicated using the numbering scheme indicated in the version of the periodic table of elements published in *Chemical and Engineering News*, 63(5), 27, 1985. In some instances, a group of elements can be indicated using a common name assigned to the group; for example, alkali metals for Group 1 elements, alkaline earth metals for Group 2 elements, and so forth.

The term "contacting" is used herein to refer to materials or components which can be blended, mixed, slurried, dissolved, reacted, treated, compounded, or otherwise contacted or combined in some other manner or by any suitable method. The materials or components can be contacted together in any order, in any manner, and for any length of time, unless otherwise specified.

Although any methods and materials similar or equivalent to those described herein can be used in the practice or testing of the invention, the typical methods and materials are herein described.

All publications and patents mentioned herein are incorporated herein by reference for the purpose of describing and disclosing, for example, the constructs and methodologies that are described in the publications and patents, which might be used in connection with the presently described invention.

Several types of ranges are disclosed in the present invention. When a range of any type is disclosed or claimed, the intent is to disclose or claim individually each possible number that such a range could reasonably encompass, including end points of the range as well as any sub-ranges and combinations of sub-ranges encompassed therein. As a representative example, the d50 particle size of the inorganic flame retardant can be in certain ranges in various aspects of this invention. By a disclosure that the d50 particle size can be in a range from about 0.5 to about 10 μm, the intent is to recite that the d50 can be any particle size within the range and, for example, can be equal to about 0.5, about 1, about 2, about 3, about 4, about 5, about 6, about 7, about 8, about 9, or about 10 μm. Additionally, the d50 particle size can be within any range from about 0.5 to about 10 μm (for example, from about 1 to about 10 μm), and this also includes any combination of ranges between about 0.5 and about 10 μm (for example, the d50 particle size can be in a range from about 1 to about 3 μm or from about 6 to about 8 μm). Likewise, all other ranges disclosed herein should be interpreted in a manner similar to this example.

The term "about" means that amounts, sizes, formulations, parameters, and other quantities and characteristics are not and need not be exact, but may be approximate and/or larger or smaller, as desired, reflecting tolerances, conversion factors, rounding off, measurement errors, and the like, and other factors known to those of skill in the art. In general, an amount, size, formulation, parameter or other quantity or characteristic is "about" or "approximate" whether or not expressly stated to be such. The term "about" also encompasses amounts that differ due to different equilibrium conditions for a composition resulting from a particular initial mixture. Whether or not modified by the term "about," the claims include equivalents to the quantities. The term "about" can mean within 10% of the reported numerical value, preferably within 5% of the reported numerical value.

DETAILED DESCRIPTION OF THE INVENTION

Disclosed herein are flame retardant compositions contain an inorganic flame retardant (aluminum trihydrate and/or magnesium hydroxide) and a flame retardant synergist (hydrotalcite and clay at a weight ratio of hydrotalcite:clay ranging from about 1:1 to about 100:1), and polymer compositions and articles of manufacture containing the flame retardant compositions.

Either hydrotalcite (HTC) or clay can be used to improve the flame retardant properties of polymer compositions containing aluminum trihydrate and/or magnesium hydroxide, but to the detriment of other properties of the polymer composition. Unexpectedly, it was found that specific combinations of HTC with clay resulted in overall polymer property combinations that could not be achieved via the use of HTC alone or clay alone. In sum, the polymer compositions disclosed herein have a surprising and beneficial combination of excellent mechanical, rheological, and flame retardant properties.

For instance, these polymer compositions—containing aluminum trihydrate and/or magnesium hydroxide, plus synergistic combinations of hydrotalcite and clay—can pass stringent flame retardant requirements, such as UL-94, with a V0 rating, but maintain acceptable mechanical properties (e.g., high tensile strength and elongation at break), rheological properties (e.g., low viscosity), and with low water uptake for better long-term stability and performance in demanding end-use applications. Additionally, and not wishing to be bound by theory, it is believed that the disclosed flame retardant compositions can offer cost reduction opportunities, as well as the use of lower filler levels to further improve the physical properties of the polymer composition, while maintaining equivalent or better flame retardant performance.

The flame retardant compositions and polymer compositions described herein offer an unexpected balance and combination of overall polymer properties that cannot be achieved using HTC alone or clay alone, nor through the use of relative amounts of these materials that are outside the ranges disclosed herein. For example, the use of HTC and clay together, but with too much clay, results in a dramatic reduction in mechanical and rheological performance, and an increase in water uptake and overall cost. Additionally, the use of HTC and clay together, but with too much HTC, results in unacceptable flame retardant performance, such as decreases in the fire performance index (FPI) and other flame retardant metrics, as well as the inability of the polymer composition to pass the Underwriters Laboratories UL-94 test with a V0 rating.

Flame Retardant Compositions

Consistent with aspects of the present invention, flame retardant compositions disclosed herein can comprise (i) from about 75 wt. % to about 99.5 wt. % of a non-halogen, inorganic flame retardant comprising aluminum trihydrate and/or magnesium hydroxide, and (ii) from about 0.5 wt. % to about 25 wt. % of a flame retardant synergist comprising (a) a hydrotalcite and (b) a clay at a weight ratio of hydrotalcite:clay in a range from about 1:1 to about 100:1. Thus, in one aspect of this invention, the flame retardant composition can contain from about 75 wt. % to about 99.5 wt. % of aluminum trihydrate and from about 0.5 wt. % to about 25 wt. % of the flame retardant synergist (hydrotalcite and clay at a weight ratio of hydrotalcite:clay in a range from about 1:1 to about 100:1). In another aspect, the flame retardant composition can contain from about 75 wt. % to about 99.5 wt. % of magnesium hydroxide and from about 0.5 wt. % to about 25 wt. % of the flame retardant synergist (hydrotalcite and clay at a weight ratio of hydrotalcite:clay in a range from about 1:1 to about 100:1). Yet, in another aspect, the flame retardant composition can contain from about 75 wt. % to about 99.5 wt. % of a mixture of aluminum trihydrate and magnesium hydroxide, and from about 0.5 wt. % to about 25 wt. % of the flame retardant synergist (hydrotalcite and clay at a weight ratio of hydrotalcite:clay in a range from about 1:1 to about 100:1).

In further aspects, flame retardant compositions consistent with the present invention also can have any of the characteristics or properties provided below, and in any combination.

The majority of the flame retardant composition is the inorganic flame retardant (aluminum trihydrate, magnesium hydroxide, or both), which generally constitutes from about 75 to about 99.5 wt. % of the flame retardant composition, based on the total weight of the inorganic flame retardant and the flame retardant synergist. In further aspects, other suitable non-limiting ranges for the amount of the inorganic flame retardant, based on the total weight of the inorganic flame retardant and the flame retardant synergist, can include the following: from about 75 to about 99 wt. %, from about 80 to about 99 wt. %, from about 90 to about 98 wt. %, from about 80 to about 95 wt. %, from about 82 to about 95 wt. %, from about 85 to about 95 wt. %, from about 78 to about 92 wt. %, or from about 82 to about 92 wt. %. Other appropriate ranges for the amount of the inorganic flame retardant are readily apparent from this disclosure.

In some aspects, the d50 particle size (median particle size) of the inorganic flame retardant can be in a range from about 0.5 to about 10 μm, such as, for instance, from about 0.5 to about 8 μm, from about 0.5 to about 6 μm, from about 0.5 to about 5 μm, from about 0.5 to about 4 μm, from about 1 to about 10 μm, from about 1 to about 8 μm, from about 1 to about 6 μm, or from about 1 to about 4 μm. Other appropriate ranges for the d50 particle size are readily apparent from this disclosure.

The surface area of the inorganic flame retardant is not limited to any particular range; however, the BET surface area of the inorganic flame retardant component often falls within a range from about 1 to about 30 m$^2$/g. In some aspects, the BET surface area can be in a range from about 1 to about 25, or from about 1 to about 20 m$^2$/g, while in other aspects, the BET surface area can be in a range from about 1 to about 15, from about 1 to about 10, or from about 2 to about 20 m$^2$/g, and the like. Other appropriate ranges for the BET surface area of the inorganic flame retardant are readily apparent from this disclosure.

In these and other aspects, the inorganic flame retardant can comprise (or consist essentially of, or consist of) aluminum trihydrate; alternatively, magnesium hydroxide; or alternatively, aluminum trihydrate and magnesium hydroxide. If both aluminum trihydrate and magnesium hydroxide are present, the relative amounts of aluminum trihydrate and magnesium hydroxide are not limited to any particular range. Moreover, in some aspects, the aluminum trihydrate, magnesium hydroxide, or both, can be uncoated or untreated (e.g., not surface treated). However, in other aspects, the aluminum trihydrate, magnesium hydroxide, or both, can comprise a surface treatment (or coating). While not limited thereto, the amount of the surface treatment typically ranges from about 0.05 to about 5 wt. %, or from about 0.1 to about 1 wt. %, based on the weight of the inorganic flame retardant. Any suitable surface treatment can be used, such as silane-based or fatty acid-based surface treatments, and these treatments can improve the compatibility of the inorganic flame retardant product with various polymers. Illustrative and non-limiting materials that are suitable for surface treating or coating the inorganic flame retardant can include a fluoropolymer, a fatty acid, a metallic fatty acid, a paraffin wax, a polyethylene wax, a polysiloxane, a polyalkylsiloxane, a polyorganosiloxane with a functional group, and the like, as well as combinations thereof.

The minor component of the flame retardant composition is the flame retardant synergist (a mixture or combination of hydrotalcite and clay), which generally constitutes from about 0.5 to about 25 wt. % of the flame retardant composition, based on the total weight of the inorganic flame retardant and the flame retardant synergist. In further aspects, other suitable non-limiting ranges for the amount of the flame retardant synergist, based on the total weight of the inorganic flame retardant and the flame retardant synergist, can include the following: from about 1 to about 25 wt. %, from about 1 to about 20 wt. %, from about 1 to about 15 wt. %, from about 2 to about 25 wt. %, from about 3 to about 10 wt. %, from about 5 to about 25 wt. %, from about 5 to about 20 wt. %, or from about 5 to about 15 wt. %. Other appropriate ranges for the amount of the flame retardant synergist are readily apparent from this disclosure.

The flame retardant synergist comprises a hydrotalcite and a clay at a weight ratio of hydrotalcite:clay in a range from about 1:1 to about 100:1. Accordingly, the hydrotalcite component is typically present at a much higher relative amount than the clay component. Illustrative and non-limiting weight ratios of hydrotalcite:clay can include the following ranges: from about 1:1 to about 50:1, from about 1:1 to about 25:1, from about 1:1 to about 20:1, from about 1:1 to about 5:1, from about 2:1 to about 25:1, from about 2:1 to about 20:1, from about 3:1 to about 100:1, from about 3:1 to about 50:1, from about 3:1 to about 25:1, from about 3:1 to about 20:1, from about 4:1 to about 100:1, from about 4:1 to about 50:1, from about 4:1 to about 25:1, or from about 4:1 to about 20:1. Other appropriate ranges for the weight ratio of hydrotalcite:clay are readily apparent from this disclosure.

Any suitable hydrotalcite can be used as the hydrotalcite component of the flame retardant synergist. Illustrative and non-limiting hydrotalcites can include a Mg/Al hydrotalcite, a Zn/Al hydrotalcite, a Mg/Zn/Al hydrotalcite, and any organically modified derivatives thereof, and the like. Combinations of more than one hydrotalcite can be used in the flame retardant synergist. Representative commercial hydrotalcites include Alcamizer Mg/Al hydrotalcite and Perkalite FR100 (AkzoNobel).

Likewise, any suitable clay can be used as the clay component of the flame retardant synergist. Illustrative and non-limiting clays can include bentonite, montmorillite, hectorite, and sepiolite, and any modified derivatives thereof (e.g., modified with an ammonium salt), and the like. Combinations of more than one clay can be used in the flame retardant synergist.

Compositions Containing Flame Retardants

This invention is also directed to, and encompasses, any compositions, formulations, composites, and articles of manufacture that contain any of the flame retardant compositions disclosed herein (and their respective characteristics or features, such as the amount of the flame retardant synergist, the hydrotalcite:clay ratio, and so forth). In a particular aspect of this invention, a polymer composition is disclosed, and in this aspect, the polymer composition can comprise any suitable polymer (one or more than one) and any of the flame retardant compositions disclosed herein.

In one aspect, the polymer in the polymer composition can comprise a thermoplastic polymer, while in another aspect, the polymer can comprise a thermoset polymer. In another aspect, the polymer can comprise, either singly or in any combination, an epoxy, an acrylic, an ester, a urethane, a silicone, and/or a phenolic. In yet another aspect, the polymer can comprise, either singly or in any combination, a polyethylene (e.g., an ethylene homopolymer or ethylene-based copolymer), a polypropylene, a polybutylene terephthalate, an acrylonitrile butadiene styrene (ABS), a polyamide, a polyimide, a polystyrene, a polycarbonate, an ethylene-vinyl acetate (EVA) copolymer, a polyolefin-styrene (e.g., ethylene-styrene), an ethylene acrylic elastomer (e.g., an ethylene-ethyl acrylate copolymer or an ethylene-methyl acrylate copolymer), an ethylene-propylene copolymer, an ethylene-propylene diene polymer, and/or an ethylene-vinyl alcohol copolymer. In still another aspect, the polymer can comprise a rubber and/or an elastomer based upon a nitrile, a butadiene, isobutylene, isoprene, a styrene butadiene, and the like, as well as any combination thereof.

In a particular aspect, the polymer in the polymer composition can comprise a polyethylene (e.g., an ethylene homopolymer or ethylene/α-olefin copolymer), an ethylene-vinyl acetate (EVA) copolymer, or a mixture or combination thereof. For instance, the polyethylene can include, either singly or in combination, any suitable ethylene-based polymer known to a skilled artisan, and often referred to in the art as LDPE, LLDPE, ULDPE, and HDPE. Likewise, the EVA copolymer can have any suitable vinyl acetate content.

While not being limited thereto, the weight ratio of polymer:flame retardant composition often can range from about 50:50 to about 25:75 in the polymer composition. Illustrative and non-limiting weight ratios of polymer:flame retardant composition can include the following ranges: from about 50:50 to about 30:70, from about 50:50 to about 35:65, from about 45:55 to about 25:75, from about 45:55 to about 30:70, from about 45:55 to about 55:65, from about 40:60 to about 25:75, from about 40:60 to about 30:70, or from about 40:60 to about 35:65. Other appropriate ranges for the weight ratio of polymer:flame retardant composition are readily apparent from this disclosure.

Beneficially, the flame retardant composition can provide improved flame retardancy to the polymer composition. For instance, the polymer composition can have a time to ignition (TTI) that is greater than that of a polymer composition prepared using the same flame retardant composition without the clay and/or greater than that of a polymer composition prepared using the same flame retardant composition without the hydrotalcite, under the same processing conditions.

Additionally or alternatively, the polymer composition can have a peak heat release rate (PHRR) that is less than that of a polymer composition prepared using the same flame retardant composition without the clay and/or less than that of a polymer composition prepared using the same flame retardant composition without the hydrotalcite, under the same processing conditions.

Additionally or alternatively, the polymer composition can have a total heat release (THR) that is less than that of a polymer composition prepared using the same flame retardant composition without the clay and/or less than that of a polymer composition prepared using the same flame retardant composition without the hydrotalcite, under the same processing conditions.

Additionally or alternatively, the polymer composition can have a maximum average rate of heat evolved (MARHE) that is less than that of a polymer composition prepared using the same flame retardant composition without the clay and/or less than that of a polymer composition prepared using the same flame retardant composition without the hydrotalcite, under the same processing conditions.

Additionally or alternatively, the polymer composition can have a fire growth rate index (FIGRA) that is less than that of a polymer composition prepared using the same flame retardant composition without the clay and/or less than that of a polymer composition prepared using the same flame retardant composition without the hydrotalcite, under the same processing conditions.

Additionally or alternatively, the polymer composition can have a fire performance index (FPI) that is greater than that of a polymer composition prepared using the same flame retardant composition without the clay and/or greater than that of a polymer composition prepared using the same flame retardant composition without the hydrotalcite, under the same processing conditions.

Moreover, in particular aspects of this invention, the polymer composition can pass an Underwriters Laboratories UL-94 test with a V0 rating, i.e., the polymer composition can have a V0 rating in a UL-94 test at a 3.2 mm sample thickness. The V0 rating indicates that the polymer composition can pass a stringent flame retardancy test.

Unlike polymer formulations that utilize a flame retardant composition containing an inorganic flame retardant and only a clay additive, the polymer compositions disclosed herein have less water uptake. For instance, the polymer composition can have a water uptake that is less than that of a polymer composition prepared using the same flame retardant composition without the clay and/or less than that of a polymer composition prepared using the same flame retardant composition without the hydrotalcite, under the same processing conditions. Often, the polymer compositions consistent with this invention can have a water uptake of less than or equal to about 1.3 wt. %, less than or equal to about 1.1 wt. %, less than or equal to about 1 wt. %, or less than or equal to about 0.9 wt. %.

Additionally or alternatively, the polymer composition can have an electrical resistivity that is greater than that of a polymer composition prepared using the same flame retardant composition without the clay and/or greater than that of a polymer composition prepared using the same flame retardant composition without the hydrotalcite, under the same processing conditions.

In addition to the excellent flame retardancy properties and low water uptake of the polymer compositions described herein, these polymer compositions also maintain excellent physical and rheological properties despite the relatively high loading of the flame retardant composition. For instance, the polymer composition can have an elongation at break that is greater than that of a polymer composition prepared using the same flame retardant composition without the clay and/or greater than that of a polymer composition prepared using the same flame retardant composition without the hydrotalcite, under the same processing conditions.

Additionally or alternatively, the polymer composition can have a tensile strength at break that is greater than that of a polymer composition prepared using the same flame retardant composition without the clay and/or greater than that of a polymer composition prepared using the same flame retardant composition without the hydrotalcite, under the same processing conditions.

Moreover, the polymer composition can have a viscosity that is less than that of a polymer composition prepared using the same flame retardant composition without the clay and/or less than that of a polymer composition prepared using the same flame retardant composition without the hydrotalcite, under the same processing conditions. The relative viscosity can be determined by the mass (MFI) or volumetric (MVR) flow rate, which is inversely related to the viscosity, i.e., a higher melt flow rate translates to a lower viscosity.

Articles of manufacture can be formed from and/or can comprise any of the polymer compositions described herein. In an aspect, the article of manufacture can comprise a gel, paste, coating, or foam. In another aspect, the article of manufacture can comprise a (polymeric) sheet or film. In yet another aspect, the article of manufacture can comprise a wire or cable. For instance, the polymer composition can be used as a wire and cable insulation layer or used in wire and cable jacketing. Other appropriate articles of manufacture and end-use applications are readily apparent from this disclosure.

EXAMPLES

The invention is further illustrated by the following examples, which are not to be construed in any way as imposing limitations to the scope of this invention. Various other aspects, modifications, and equivalents thereof which, after reading the description herein, may suggest themselves to one of ordinary skill in the art without departing from the spirit of the present invention or the scope of the appended claims.

The d50 particles size, or median particle size, refers to the particle size for which 50% of the sample has a smaller size and 50% of the sample has a larger size. Particle size measurements can be determined by laser diffraction using a Cilas 1064 L laser spectrometer from Quantachrome according to ISO 13320. BET surface areas can be determined in accordance with DIN-66132 using Micromeritics Gemini V and Gemini VII instruments.

Cone calorimetry measurements were made according to ASTM E 1354 at 35 kW/m² on 3 mm thick compression molded plates. TTI (time to ignition, sec) is the time when the sample ignites due to heat exposure in the cone calorimeter, PHRR (peak heat release rate, kW/m²) is peak of the heat release rate curve, THR is the total heat released (MJ/m²), MARHE is the maximum average rate of heat evolved (kW/m²), FIGRA is the fire growth rate index (kW/m²/sec), and FPI is the fire performance index (TTI/PHRR, sec-m²/kW).

The char strength test (or figure pressure test) was conducted by applying a pressure on the residues of the cone burning test. If the sample could hold this pressure without cracking, a rating of 1 was given, whereas if the sample cracked immediately (indicative of an unstable structure), a rating of 3 was given.

The Underwriters Laboratories UL-94 test with a 3.2 mm sample thickness was used to determine if flame retardant polymer compositions achieved a V0 rating.

The water uptake (wt. %) was determined by immersing hot pressed samples (10×10×2 mm) of the polymer composition in a heated water bath (70° C.). After 7 days, the samples were removed and the difference in weight before and after the immersion test was calculated based on the total weight of the sample.

Electrical resistivity (E. res) was determined using a Current Resistance Meter (Mili-To 2, Dr. Thiedig) to measure the electrical resistivity of the sample after the water immersion test.

To determine melt flow rates (in units of g/10 min (MFI) or mL/10 min (MVR)), granules of the polymer composition were heated to 150° C. and forced to flow out of a cylinder through a capillary die (2.095 mm, length 8 mm) under a constant load of 21.6 kg (ISO 1133, ASTM D1238).

The tensile strength (TS) and elongation at break (E@Break) were measured in accordance with DIN 53504 and EN ISO 527.

The following polymer formulation was used in Examples 1-6 that follow: 67 phr of an EVA copolymer with 27 wt. % vinyl acetate (Escorene Ultra 00328), 18 phr of an ethylene/1-butene LLDPE (LLDPE 1001 XV), 17 phr of compatibilizers (Fusabond E226 (anhydride modified polyethylene) and Lotader 3210 (random terpolymer of ethylene, acrylic ester and maleic anhydride)), and 0.75 phr of an antioxidant (Ethanox 310). Suitable methods of incorporation and addition of the alumina trihydrate (ATH, Martinal® OL-104-LEO), magnesium hydroxide (MDH, Magnifin® H5), hydrotalcite (HTC, organically modified Mg/Al hydrotalcite, Alcamizer in Examples 1-4 and Alcamizer plus in Examples 5-6), clay (Cloisite 20, bis(hydrogenated tallow alkyl)dimethyl, salt with bentonite), and the other components of the polymer composition were used to ensure uniform mixing and distribution of the flame retardant polymer compositions. Typical apparatus can include a Buss Ko-kneader, internal mixers, Farrel continuous mixers, or twin screw extruders, as well as single screw extruders or two roll mills in some cases. The compounded product can then be molded or extruded in a subsequent processing step.

Example 1

Example 1 used 61.5 wt. % (160 phr) of a flame retardant composition. Four flame retardant compositions were evaluated: (i) ATH, (ii) ATH+HTC at a ATH:HTC weight ratio of 9:1, (iii) ATH+Clay at a ATH:Clay weight ratio of 9:1, and (iv) ATH+HTC+Clay at a ATH:HTC:Clay weight ratio of 9:0.8:0.2 (HTC:Clay=4:1).

FIG. 1 illustrates the heat release rate (HRR) curves for the four polymer compositions of Example 1, and Table I summarizes the flame retardant properties (from FIG. 1), mechanical properties, and rheological and other properties of the four polymer compositions of Example 1. Beneficially, and unexpectedly, the flame retardant composition containing ATH+HTC+Clay had the lowest PHRR, the lowest FIGRA, and the highest FPI values of all the samples; and lower THR values than the ATH+Clay sample; and lower MARHE value than the ATH+HTC sample. Moreover, the ATH+HTC+Clay sample passed the UL-94 test with a V0 rating. Furthermore, as compared to the sample with Clay (i.e., ATH+Clay), the ATH+HTC+Clay sample had lower viscosity (higher volumetric flow rate), superior tensile strength and elongation at break, and much less water uptake. Additionally, the ATH+HTC+Clay sample had higher electrical resistivity and better insulating properties than comparable materials containing only the ATH+HTC or ATH+Clay.

These results indicate that the ATH+HTC+Clay flame retardant composition provides a unique combination of flame retardant, mechanical, rheological, and other properties that cannot be met with ATH and only HTC or with ATH and only Clay.

Example 2

Example 2 used 59.2 wt. % (145 phr) of a flame retardant composition. Four flame retardant compositions were evaluated: (i) ATH, (ii) ATH+HTC at a ATH:HTC weight ratio of 9:1, (iii) ATH+Clay at a ATH:Clay weight ratio of 9:1, and (iv) ATH+HTC+Clay at a ATH:HTC:Clay weight ratio of 9:0.8:0.2 (HTC:Clay=4:1).

Figure 2:
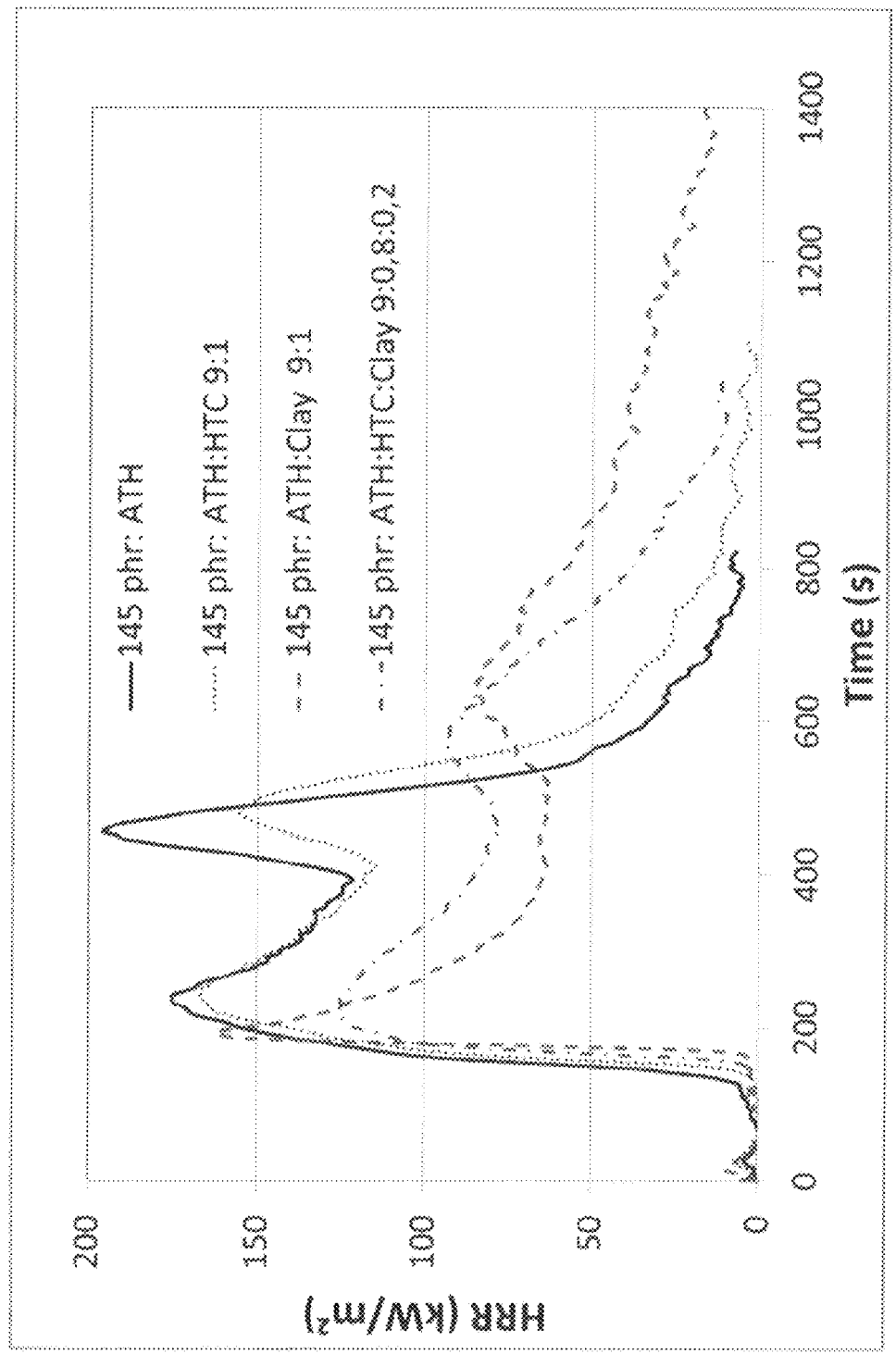
FIG. 2 presents plots of the heat release rate (HRR) curves for the flame retardant polymer compositions of Example 2.

FIG. 2 illustrates the heat release rate (HRR) curves for the four polymer compositions of Example 2, and Table II summarizes the flame retardant properties (from FIG. 2), mechanical properties, and rheological and other properties of the four polymer compositions of Example 2. Beneficially, and unexpectedly, the flame retardant composition containing ATH+HTC+Clay had the lowest PHRR, the lowest THR, the lowest FIGRA, and the highest FPI values of all the flame retardant synergist samples; and higher TTI and lower MARHE values than the ATH+HTC sample. Furthermore, as compared to the sample with Clay (i.e., ATH+Clay), the ATH+HTC+Clay sample had lower viscosity (higher volumetric flow rate), superior tensile strength and elongation at break, and much less water uptake. Moreover, the ATH+HTC+Clay sample had higher electrical resistivity and better insulating properties than comparable materials containing only the ATH+HTC or ATH+Clay.

These results indicate that the ATH+HTC+Clay flame retardant composition provides a unique combination of flame retardant, mechanical, rheological, and other properties that cannot be met with ATH and only HTC or with ATH and only Clay.

Example 3

Example 3 used 56.5 wt. % (130 phr) of a flame retardant composition. Four flame retardant compositions were evaluated: (i) MDH, (ii) MDH+HTC at a MDH:HTC weight ratio of 9:1, (iii) MDH+Clay at a MDH:Clay weight ratio of 9:1, and (iv) MDH+HTC+Clay at a MDH:HTC:Clay weight ratio of 9:0.8:0.2 (HTC:Clay=4:1).

Figure 3:
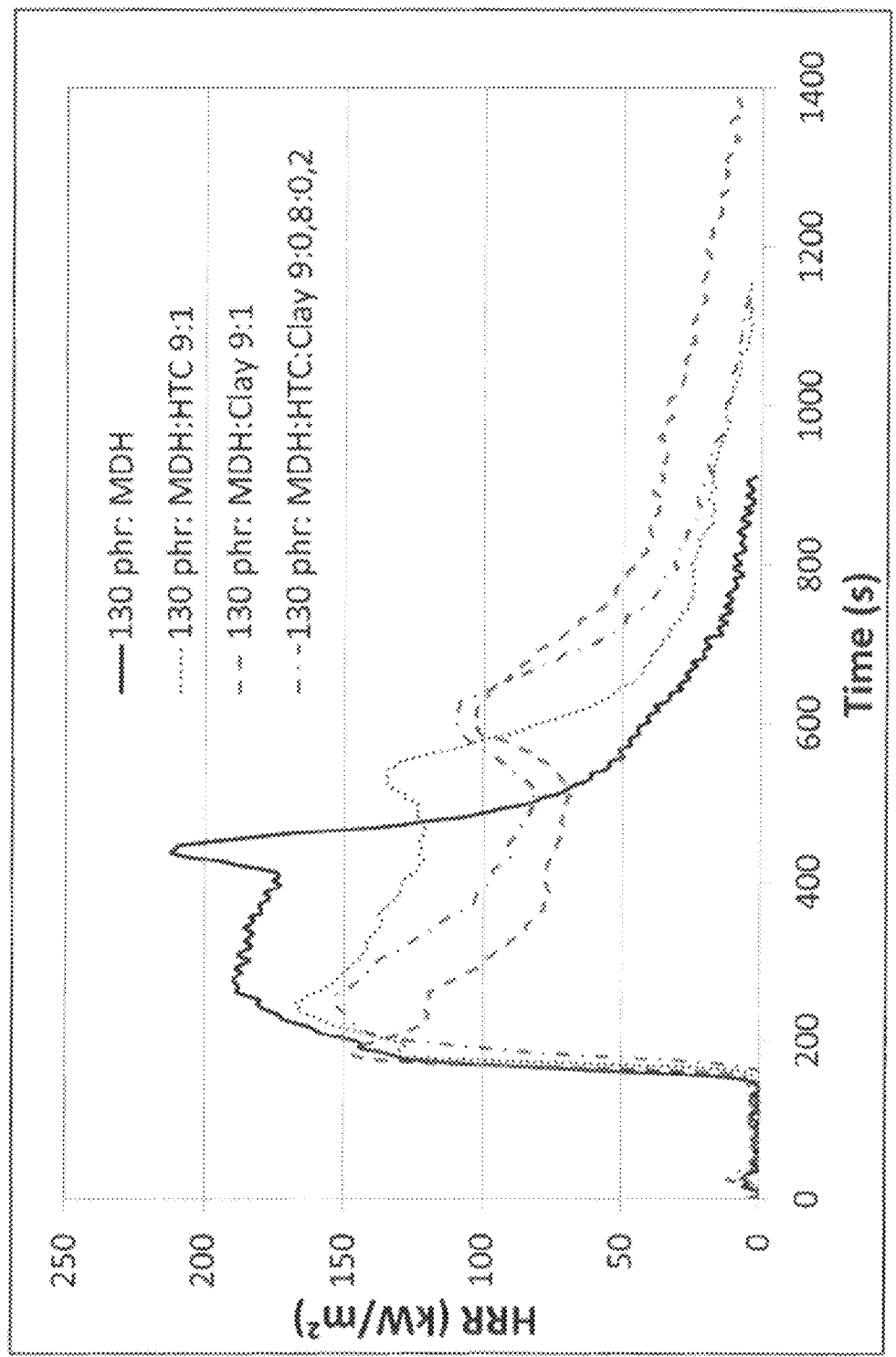
FIG. 3 presents plots of the heat release rate (HRR) curves for the flame retardant polymer compositions of Example 3.

FIG. 3 illustrates the heat release rate (HRR) curves for the four polymer compositions of Example 3, and Table III summarizes the flame retardant properties (from FIG. 3), mechanical properties, and rheological and other properties of the four polymer compositions of Example 3. Beneficially, and unexpectedly, the flame retardant composition containing MDH+HTC+Clay had the highest TTI, the lowest THR, the lowest FIGRA, and the highest FPI values of all the samples; and lower PHRR and lower MARHE values than the MDH+HTC sample. Moreover, the MDH+HTC+Clay sample passed the UL-94 test with a V0 rating. Furthermore, as compared to the sample with Clay (i.e., MDH+Clay), the MDH+HTC+Clay sample had lower viscosity (higher melt flow index), and equal or superior tensile strength and elongation at break, and much less water uptake.

Figure 4:
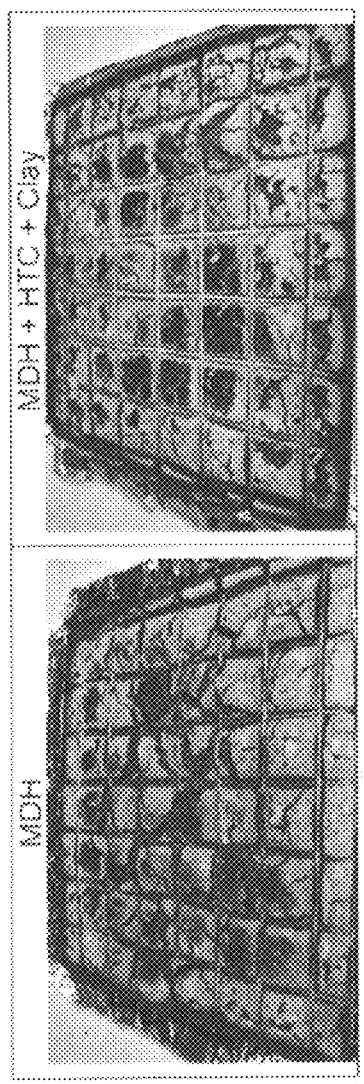
FIG. 4 illustrates the char performance of certain flame retardant polymer compositions containing MDH.

FIG. 4 illustrates the char performance of the MDH sample (char strength rating of 2) and the MDH+HTC+Clay sample (char strength rating of 1: the highest rating).

Similar to the ATH results, Example 3 indicates that the MDH+HTC+Clay flame retardant composition provides a unique combination of flame retardant, mechanical, rheological, and other properties that cannot be met with MDH and only HTC or with MDH and only Clay.

Example 4

Example 4 used 61.5 wt. % (160 phr) of a flame retardant composition. Four flame retardant compositions were evaluated: (i) MDH, (ii) MDH+HTC at a MDH:HTC weight ratio of 9:1, (iii) MDH+Clay at a MDH:Clay weight ratio of 9:1, and (iv) MDH+HTC+Clay at a MDH:HTC:Clay weight ratio of 9:0.8:0.2 (HTC:Clay=4:1).

Figure 5:
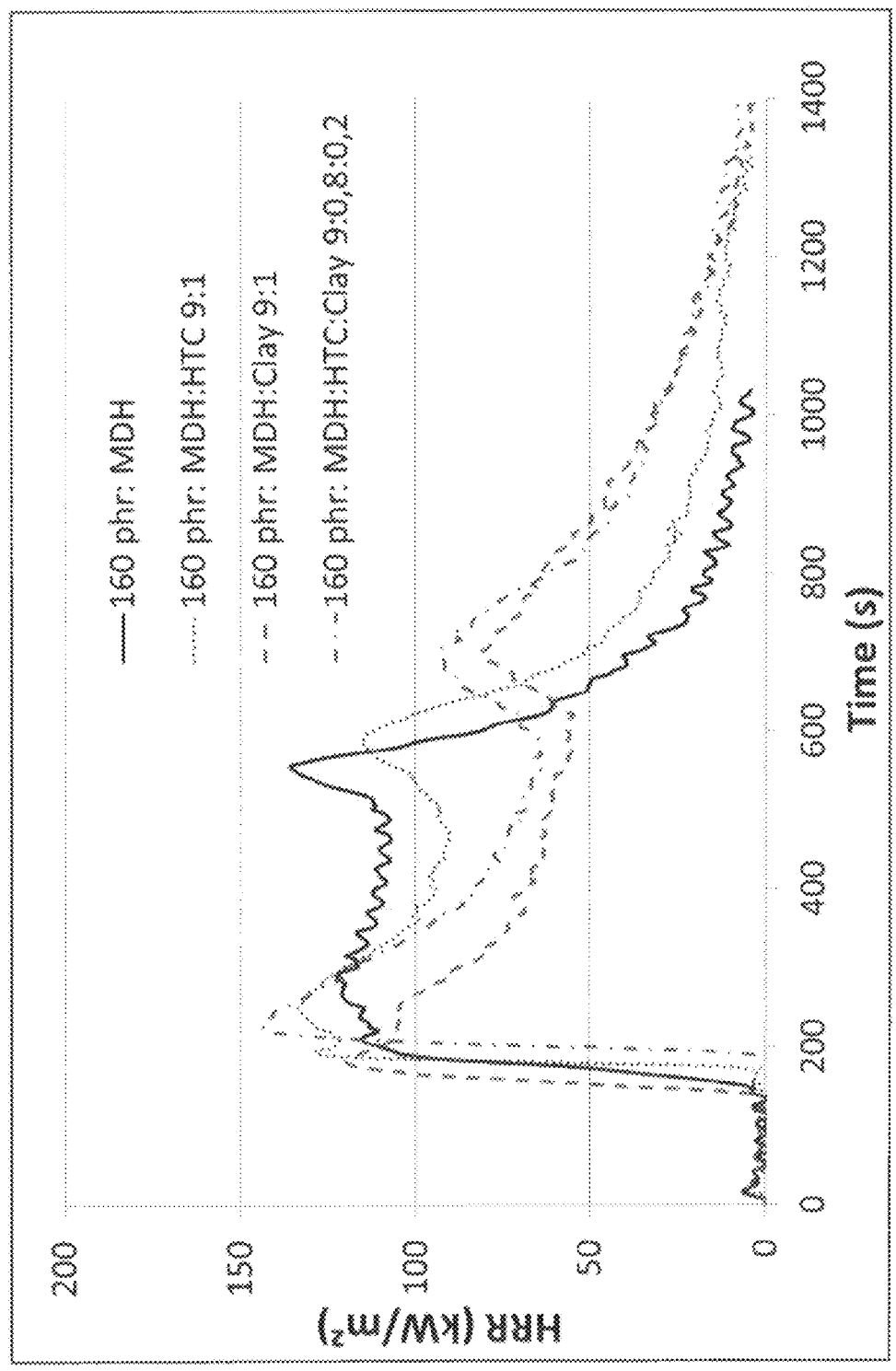
FIG. 5 presents plots of the heat release rate (HRR) curves for the flame retardant polymer compositions of Example 4.

FIG. 5 illustrates the heat release rate (HRR) curves for the four polymer compositions of Example 4, and Table IV summarizes the flame retardant properties (from FIG. 5), mechanical properties, and rheological and other properties of the four polymer compositions of Example 4. Beneficially, and unexpectedly, the flame retardant composition containing MDH+HTC+Clay had the highest TTI, the lowest FIGRA, and the highest FPI values of all the flame retardant synergist samples; and a lower MARHE value than the MDH+HTC sample. Moreover, the MDH+HTC+Clay sample passed the UL-94 test with a V0 rating. Furthermore, as compared to the sample with Clay (i.e., MDH+Clay), the MDH+HTC+Clay sample had lower viscosity (higher volumetric flow rate), superior tensile strength and elongation at break, and much less water uptake.

These results indicate that the MDH+HTC+Clay flame retardant composition provides a unique combination of flame retardant, mechanical, rheological, and other properties that cannot be met with MDH and only HTC or with MDH and only Clay.

Example 5

Example 5 used 61.5 wt. % (160 phr) of a flame retardant composition. Four flame retardant compositions were evaluated: (i) ATH, (ii) ATH+HTC at a ATH:HTC weight ratio of 9:1, (iii) ATH+Clay at a ATH:Clay weight ratio of 90:0.5, and (iv) ATH+HTC+Clay at a ATH:HTC:Clay weight ratio of 90:9.5:0.5 (HTC:Clay=19:1).

Figure 6:
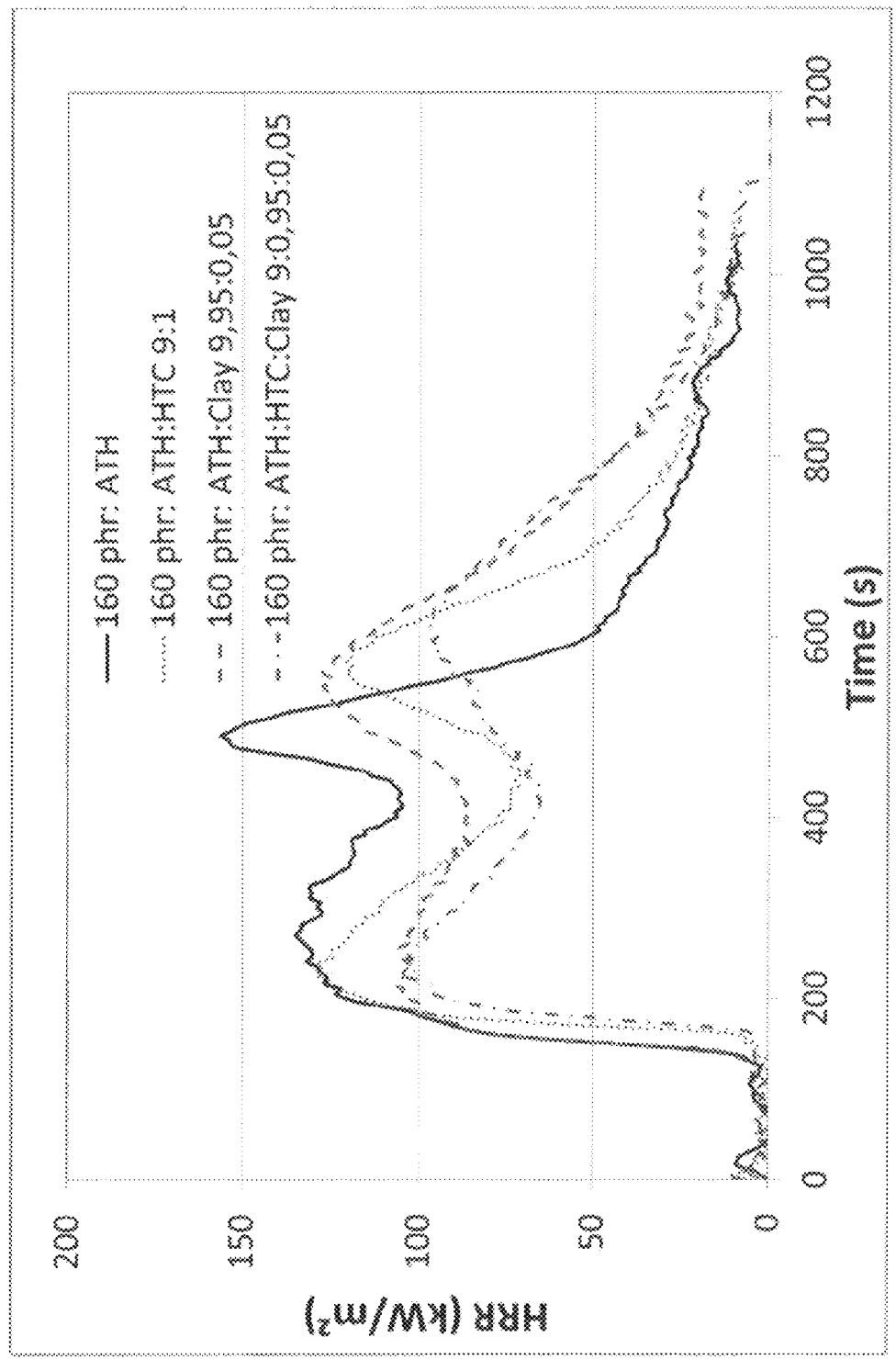
FIG. 6 presents plots of the heat release rate (HRR) curves for the flame retardant polymer compositions of Example 5.

FIG. 6 illustrates the heat release rate (HRR) curves for the four polymer compositions of Example 5, and Table V summarizes the flame retardant properties (from FIG. 6), mechanical properties, and rheological and other properties of the four polymer compositions of Example 5. Beneficially, and unexpectedly, the flame retardant composition containing ATH+HTC+Clay had the lowest PHRR, the lowest MARHE, and the highest FPI values of all the samples. Moreover, the ATH+HTC+Clay sample passed the UL-94 test with a V0 rating. Furthermore, as compared to the sample with Clay (i.e., ATH+Clay) and the sample with HTC (i.e., ATH+HTC), the ATH+HTC+Clay sample had roughly equivalent viscosity (melt flow index), tensile strength and elongation at break, and water uptake.

Table V also summarizes the char strength of the four polymer compositions of Example 5, with the ATH+Clay and ATH+HTC+Clay samples having a char strength rating of 2 (a rating of 1 is the best, and 3 is the worst).

These results indicate that the ATH+HTC+Clay flame retardant composition provides comparable mechanical, rheological, and other properties to that of the sample with ATH and only HTC or the sample with ATH and only Clay, but with significantly improved flame retardant performance (lower PHRR, lower MARHE, higher FPI, and V0 rating).

Example 6

Example 6 used 61.5 wt. % (160 phr) of a flame retardant composition. Four flame retardant compositions were evaluated: (i) ATH, (ii) ATH+HTC at a ATH:HTC weight ratio of 9:1, (iii) ATH+Clay at a ATH:Clay weight ratio of 9:1, and (iv) ATH+HTC+Clay at a ATH:HTC:Clay weight ratio of 90:9.5:0.5 (HTC:Clay=19:1).

Figure 7:
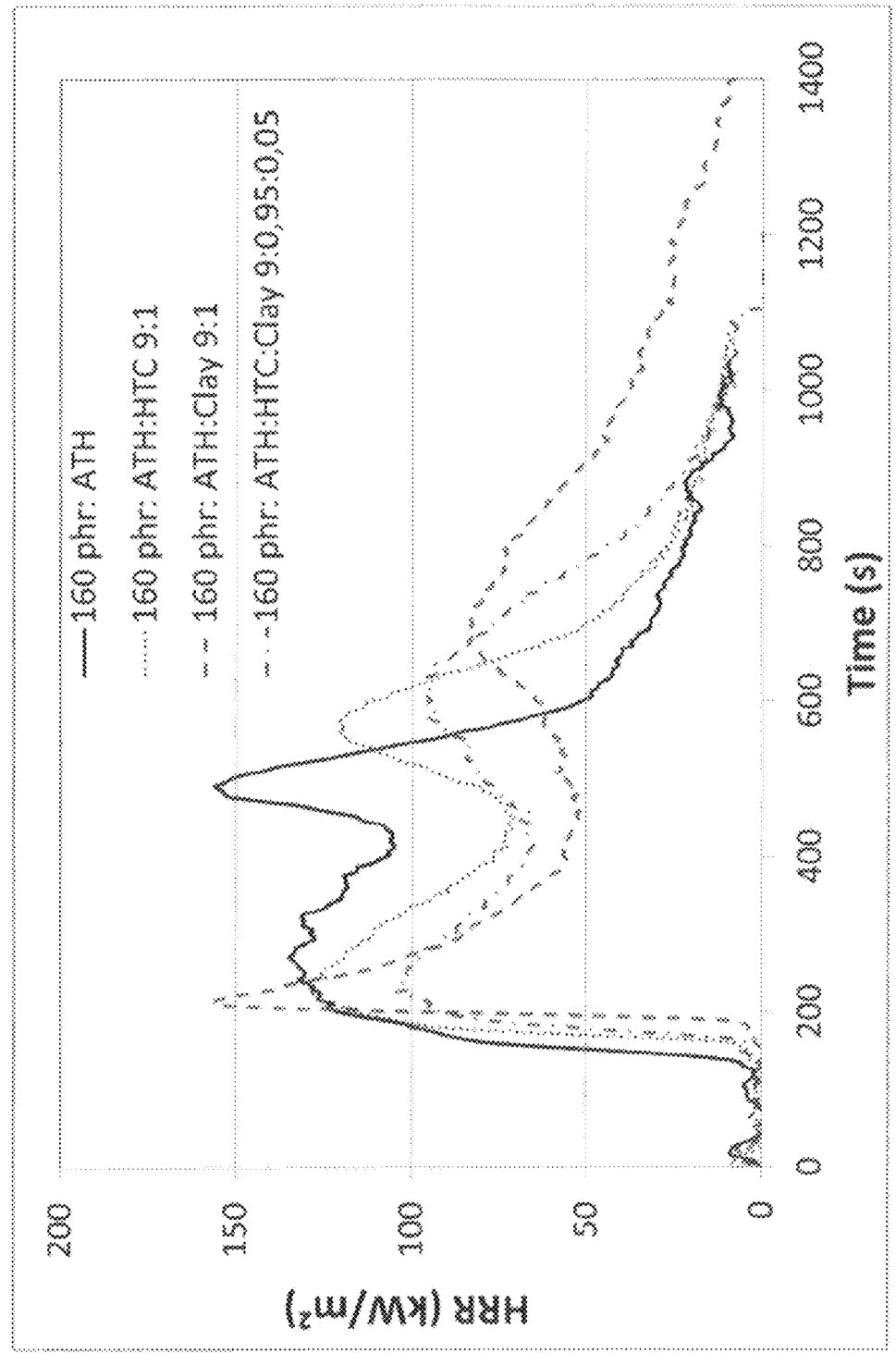
FIG. 7 presents plots of the heat release rate (HRR) curves for the flame retardant polymer compositions of Example 6.

FIG. 7 illustrates the heat release rate (HRR) curves for the four polymer compositions of Example 6, and Table VI summarizes the flame retardant properties (from FIG. 7), mechanical properties, and rheological and other properties of the four polymer compositions of Example 6. Beneficially, and unexpectedly, the flame retardant composition containing ATH+HTC+Clay had the lowest PHRR and the highest FPI values of all the samples; and lower MARHE values than the ATH+HTC sample. Moreover, the ATH+HTC+Clay sample passed the UL-94 test with a V0 rating. Furthermore, as compared to the sample with HTC (i.e., ATH+HTC), the ATH+HTC+Clay sample had roughly equivalent viscosity (melt flow index), tensile strength and elongation at break, and water uptake, but compared to the sample with Clay (i.e., ATH+Clay), the ATH+HTC+Clay sample had significantly lower viscosity (higher melt flow index), significantly higher tensile strength and elongation at break, and significantly lower water uptake.

These results indicate that Clay (by itself) can be used to improve the flame retardant performance, but will significantly, and negatively, impact other performance properties, whereas the ATH+HTC+Clay flame retardant composition provides comparable performance properties to those of the sample with ATH+HTC, but with dramatically improved flame retardant performance.

Figure 8:
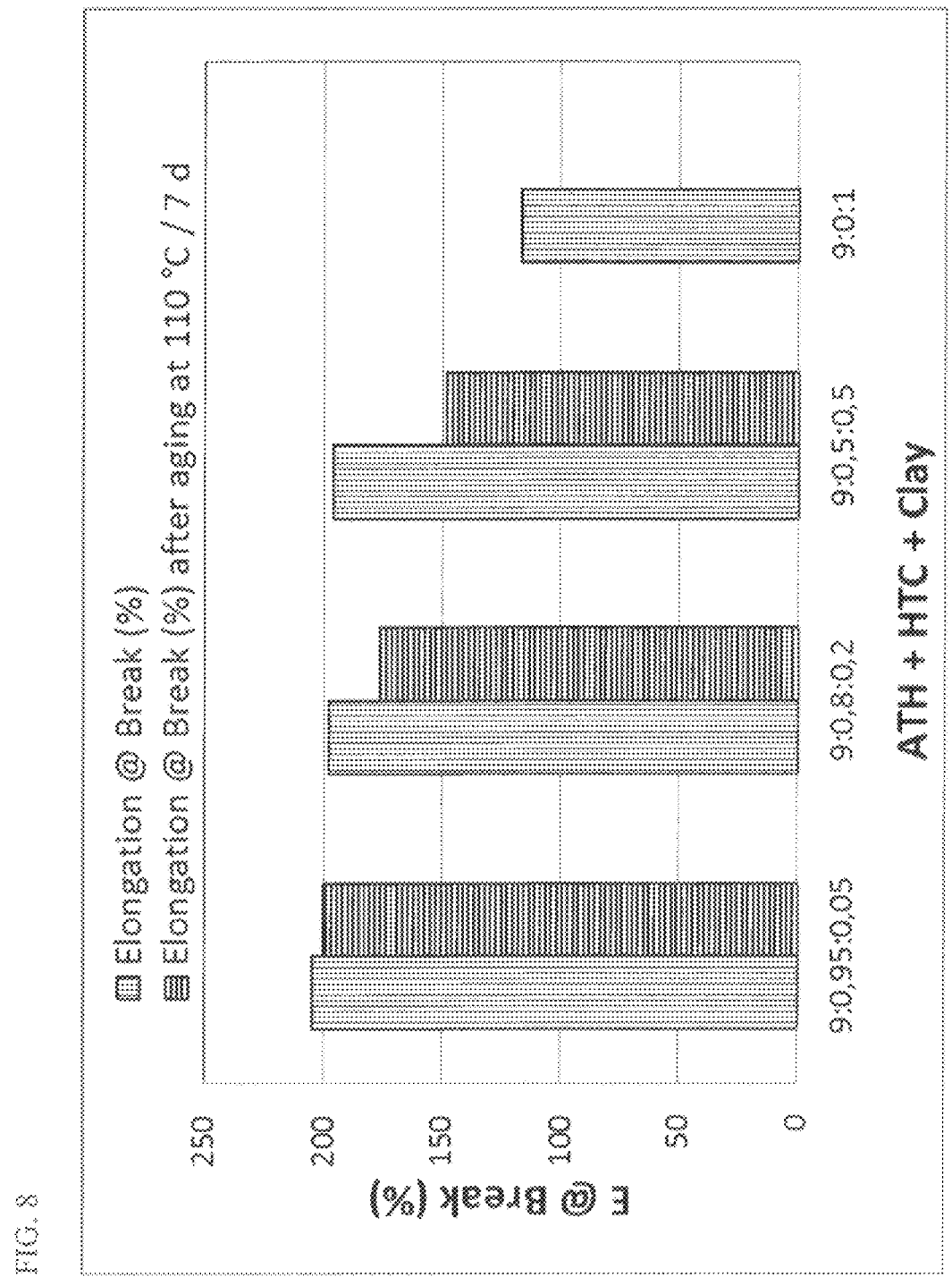
FIG. 8 presents a bar chart of elongation at break for polymer compositions containing ATH and different ratios of HTC:Clay.

FIG. 8 is a bar chart summarizing the elongation at break performance of polymer compositions containing ATH and different ratios of HTC:Clay (with 61.5 wt. % (160 phr) of the flame retardant composition). Notably, if Clay is used without any HTC, the percent elongation at break is significantly worse than examples where HTC+Clay are used. After aging, the presence of more Clay further deteriorates mechanical properties (accelerates polymer degradation). Thus, in order to maintain physical properties, the weight ratio of HTC:Clay generally should be greater than or equal to about 1:1, with higher ratios of HTC:Clay resulting in better physical properties.

Figure 9:
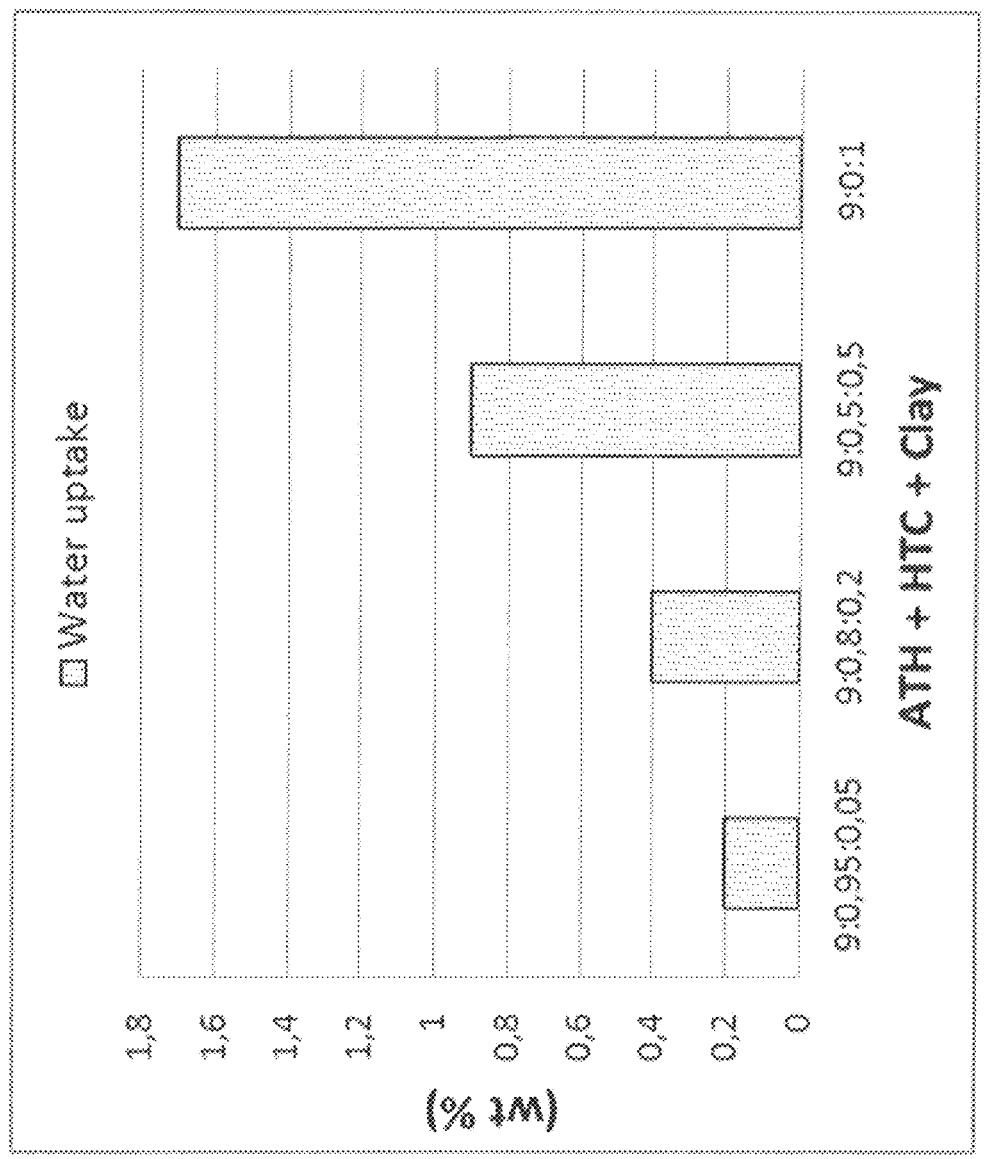
FIG. 9 presents a bar chart of the water uptake for polymer compositions containing ATH and different ratios of HTC:Clay.

FIG. 9 is a bar chart summarizing the water uptake for polymer compositions containing ATH and different ratios of HTC:Clay (with 61.5 wt. % (160 phr) of the flame retardant composition). Notably, as the amount of Clay increases, the water uptake dramatically increases. For polymer compositions with flame retardancy, the presence of additional water/moisture can make such compositions unsuitable for many end-use applications (e.g., certain wire and cable applications).

Figure 10:
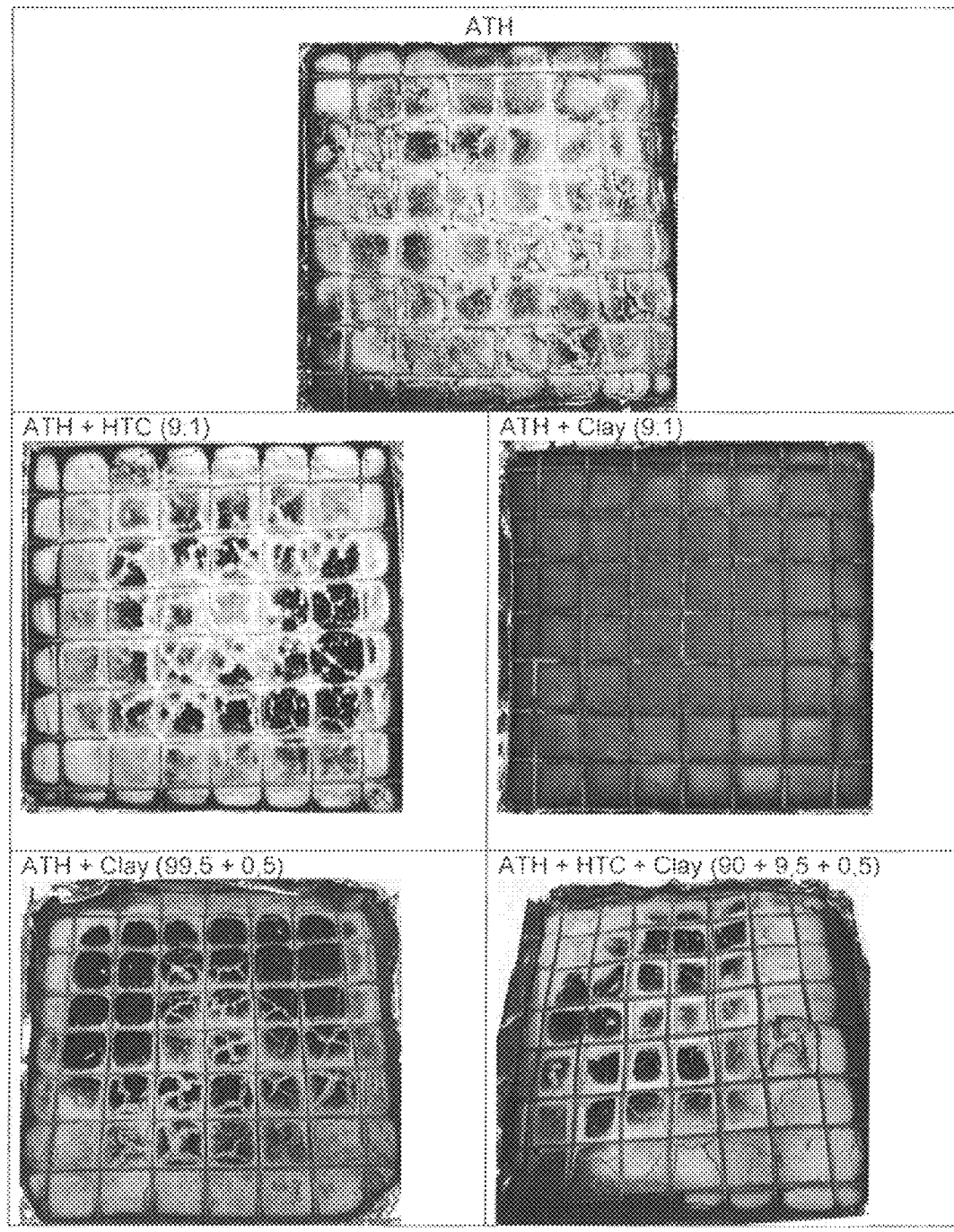
FIG. 10 illustrates the char performance of certain flame retardant polymer compositions containing ATH.

FIG. 10 illustrates the char performance of certain flame retardant polymer compositions containing ATH. The ATH+Clay sample showed the best char performance and compact char layer (albeit with reduced physical properties), however, the char performance of the ATH+HTC+Clay sample was superior to that of the ATH+HTC sample and the ATH sample.

Example 7

The following polymer formulation was used in Example 7:75 phr of an EVA copolymer with 27 wt. % vinyl acetate (Escorene Ultra 00328), 25 phr of an ethylene/1-butene LLDPE (LLDPE 1001 XV), 0.5 phr of a silane crosslinking agent (Dynasylan Silfin 13, polyethylene crosslinking agent), 0.9 phr of a multifunctional silane crosslinking agent (Dynasylan Silfin 25, polyethylene and ethylene copolymer crosslinking agent), and 0.4 phr of an antioxidant (Ethanox 310). Compounding was done in 2-steps: first, the EVA and LLDPE were compounded with the silane crosslinking agents at 170-200° C., stabilized with the antioxidant, and in the second step, the flame retardant composition was combined with the polymer.

Reference Example 7A used 61.5 wt. % (160 phr) of a flame retardant composition consisting of a precipitated ATH (OL-104 LEO), which was added in two equal portions in two feed zones in a Buss compounding line. The first portion of the ATH was added in the first part of the compounding line, while the second portion of the ATH was added after the reactive mixing zone of the compounding line. In Example 7B, the same formulation as Example 7A was used, with the exception that the 50% of ATH feedstock in the second feed zone was replaced by the following flame retardant composition: ATH+HTC+Clay at a ATH:HTC:Clay weight ratio of 90:5:5 (HTC:Clay=1:1).

The flame retardant properties for the cross-linked polymer compositions of Examples 7A-7B were evaluated by UL-94 testing. The polymer composition of Example 7B demonstrated non-dripping performance having a V0 rating, while the composition of Example 7A failed the UL-94 test. Tensile strengths for Example 7A and Example 7B were 15.2 N/mm$^2$ and 15.7 N/mm$^2$, respectively, while the elongations at break for Example 7A and Example 7B were 195% and 151%, respectively. Thus, Example 7A and Example 7B has comparable physical properties.

TABLE I

Example 1 - ATH-based formulations with 160 phr (61.5 wt. %) loading of the flame retardant composition.

| | Flame retardancy | | | | | | Dripping |
|---|---|---|---|---|---|---|---|
| | Cone Calorimetry | | | | | | |
| Sample ID (160 phr) | TTI (s) | PHRR (kW/m$^2$) | THR (MJ/m$^2$) | MARHE (kW/m$^2$) | FIGRA (kW/m$^2$/s) | FPI TTI/PHRR (s · m$^2$/kW) | test UL-94 (rating) |
| ATH | 119 | 154 | 63 | 89.6 | 0.60 | 0.67 | N/A |
| ATH + HTC | 128 | 130 | 59 | 88.6 | 0.60 | 0.98 | N/A |
| ATH + Clay | 163 | 156 | 66 | 59.8 | 0.74 | 1.06 | V0 |
| ATH + HTC + Clay | 139 | 116 | 63 | 67.7 | 0.58 | 1.20 | V0 |

| | Mechanical and rheological properties | | | Others | |
|---|---|---|---|---|---|
| Sample ID (160 phr) | MVR (mL/10 min) | E @ Break (%) | TS (MPa) | Water uptake (wt. %) | E. res. × 10$^{12}$ (Ω * cm) |
| ATH | 4.0 | 205 | 12.1 | 0.3 | 16 |
| ATH + HTC | 3.2 | 193 | 12.0 | 0.4 | 5.1 |
| ATH + Clay | 0.8 | 117 | 10.7 | 1.7 | 1.9 |
| ATH + HTC + Clay | 3.3 | 198 | 11.3 | 0.7 | 6.7 |

TABLE II

Example 2 - ATH-based formulation with 145 phr (59.2 wt. %) loading of the flame retardant composition.

| | Flame retardancy | | | | | | |
|---|---|---|---|---|---|---|---|
| | Cone Calorimetry | | | | | | Dripping |
| Sample ID (145 phr) | TTI (s) | PHRR (kW/m$^2$) | THR (MJ/m$^2$) | MARHE (kW/m$^2$) | FIGRA (kW/m$^2$/s) | FPI TTI/PHRR (s·m$^2$/kW) | test UL-94 (rating) |
| ATH | 108 | 191 | 57.6 | 100 | 0.75 | 0.59 | N/A |
| ATH + HTC | 123 | 167 | 65.0 | 98 | 0.74 | 0.74 | N/A |
| ATH + Clay | 146 | 162 | 71.6 | 64 | 0.85 | 0.90 | V0 |
| ATH + HTC + Clay | 131 | 126 | 61.0 | 73 | 0.61 | 1.04 | N/A |

| | Mechanical and rheological properties | | | Others | |
|---|---|---|---|---|---|
| Sample ID (145 phr) | MVR (mL/10 min) | E @ Break (%) | TS (MPa) | Water uptake (wt. %) | E. res. × 10^12 (Ω * cm) |
| ATH | 4.8 | 210 | 12.0 | 0.3 | 19 |
| ATH + HTC | 4.6 | 215 | 12.3 | 0.4 | 7.1 |
| ATH + Clay | 1.6 | 165 | 10.7 | 1.5 | 2.1 |
| ATH + HTC + Clay | 4.3 | 193 | 11.2 | 0.6 | 7.4 |

TABLE III

Example 3 - MDH-based formulation with 130 phr (56.5 wt. %) loading of the flame retardant composition.

| | Flame retardancy | | | | | | |
|---|---|---|---|---|---|---|---|
| | Cone Calorimetry | | | | | | Dripping |
| Sample ID (130 phr) | TTI (s) | PHRR (kW/m$^2$) | THR (MJ/m$^2$) | MARHE (kW/m$^2$) | FIGRA (kW/m$^2$/s) | FPI TTI/PHRR (s·m$^2$/kW) | test UL-94 (rating) |
| MDH | 128 | 212 | 68 | 116 | 0.76 | 0.58 | N/A |
| MDH + HTC | 138 | 168 | 70 | 96 | 0.72 | 0.82 | N/A |
| MDH + Clay | 134 | 147 | 71 | 72 | 0.81 | 0.91 | V0 |
| MDH + HTC + Clay | 140 | 154 | 66 | 81 | 0.68 | 0.91 | V0 |

| | Mechanical and rheological properties | | | Others | |
|---|---|---|---|---|---|
| Sample ID (130 phr) | MFI (g/10 min) | E @ Break (%) | TS (MPa) | Water uptake (wt. %) | E. res. × 10^12 (Ω * cm) |
| MDH | 7.4 | 195 | 13.8 | 0.38 | 470 |
| MDH + HTC | 6.6 | 209 | 13.1 | 0.39 | 4.3 |
| MDH + Clay | 4.9 | 207 | 10.8 | 1.64 | 0.8 |
| MDH + HTC + Clay | 6.6 | 207 | 12.0 | 0.78 | 0.5 |

TABLE IV

Example 4 - MDH-based formulation with 160 phr (61.5 wt. %) loading of the flame retardant composition.

| | Flame retardancy | | | | | | |
|---|---|---|---|---|---|---|---|
| | Cone Calorimetry | | | | | | Dripping |
| Sample ID (160 phr) | TTI (s) | PHRR (kW/m$^2$) | THR (MJ/m$^2$) | MARHE (kW/m$^2$) | FIGRA (kW/m$^2$/s) | FPI TTI/PHRR (s·m$^2$/kW) | test UL-94 (rating) |
| MDH | 128 | 136 | 59 | 82 | 0.56 | 0.86 | V0 |
| MDH + HTC | 153 | 134 | 66 | 78 | 0.66 | 1.14 | V0 |

TABLE IV-continued

Example 4 - MDH-based formulation with 160 phr (61.5 wt. %) loading of the flame retardant composition.

| | | | | | | | |
|---|---|---|---|---|---|---|---|
| MDH + Clay | 126 | 120 | 64 | 62 | 0.66 | 1.05 | V0 |
| MDH + HTC + Clay | 167 | 144 | 69 | 67 | 0.64 | 1.16 | V0 |

| | Mechanical and rheological properties | | | Others | |
|---|---|---|---|---|---|
| Sample ID (160 phr) | MVR (mL/10 min) | E @ Break (%) | TS (MPa) | Water uptake (wt. %) | E. res. × $10^{12}$ ($\Omega \cdot cm$) |
| MDH | 2.5 | 125 | 14.9 | 0.36 | 82 |
| MDH + HTC | 2.8 | 169 | 14.3 | 0.44 | 1.3 |
| MDH + Clay | 1.6 | 154 | 11.0 | 1.67 | 0.7 |
| MDH + HTC + Clay | 2.8 | 155 | 12.5 | 0.79 | 0.6 |

TABLE V

Example 5 - ATH-based formulation with 160 phr (61.5 wt. %) loading of the flame retardant composition.

| Sample ID (160 phr) | MFI (g/10 min) | E @ Break (%) | TS (MPa) | Water uptake (wt. %) | PHRR (kW/m$^2$) | MARHE (kW/m$^2$) | FPI TTI/PHRR (s · m$^2$/kW) |
|---|---|---|---|---|---|---|---|
| ATH | 5.9 | 205 | 12.1 | 0.3 | 154 | 90 | 0.67 |
| ATH + HTC | 5.0 | 195 | 11.8 | 0.4 | 130 | 75 | 1.02 |
| ATH + Clay | 5.8 | 202 | 11.3 | 0.4 | 125 | 80 | 0.90 |
| ATH + HTC + Clay | 5.0 | 196 | 11.6 | 0.4 | 104 | 64 | 1.37 |

| Sample ID (160 phr) | UL-94 rating (3.2 mm) | Char Strength |
|---|---|---|
| ATH | N/A | 3 |
| ATH + HTC | N/A | 3 |
| ATH + Clay | N/A | 2 |
| ATH + HTC + Clay | V0 | 2 |

TABLE VI

Example 6 - ATH-based formulation with 160 phr (61.5 wt. %) loading of the flame retardant composition.

| Sample ID (160 phr) | MFI (g/10 min) | E @ Break (%) | TS (MPa) | Water uptake (wt. %) | PHRR (kW/m$^2$) | MARHE (kW/m$^2$) | FPI TTI/PHRR (s · m$^2$/kW) |
|---|---|---|---|---|---|---|---|
| ATH | 5.9 | 205 | 12.1 | 0.3 | 154 | 90 | 0.67 |
| ATH + HTC | 5.0 | 195 | 11.8 | 0.4 | 130 | 75 | 1.02 |
| ATH + Clay | 1.2 | 117 | 10.7 | 1.7 | 156 | 59 | 1.06 |
| ATH + HTC + Clay | 5.0 | 196 | 11.6 | 0.4 | 104 | 64 | 1.37 |

| Sample ID (160 phr) | UL-94 rating (3.2 mm) | Char Strength |
|---|---|---|
| ATH | N/A | 3 |
| ATH + HTC | N/A | 3 |
| ATH + Clay | V0 | 1 |
| ATH + HTC + Clay | V0 | 2 |

The invention is described above with reference to numerous aspects and specific examples. Many variations will suggest themselves to those skilled in the art in light of the above detailed description. All such obvious variations are within the full intended scope of the appended claims. Other aspects of the invention can include, but are not limited to, the following (aspects are described as "comprising" but, alternatively, can "consist essentially of" or "consist of"):

Aspect 1. A flame retardant composition comprising:

(i) from about 75 wt. % to about 99.5 wt. % of an inorganic flame retardant comprising aluminum trihydrate and/or magnesium hydroxide; and (ii) from about 0.5 wt. % to about 25 wt. % of a flame retardant synergist comprising: (a) a hydrotalcite; and (b) a clay;

wherein the weight ratio of hydrotalcite:clay is in a range from about 1:1 to about 100:1.

Aspect 2. The flame retardant composition defined in aspect 1, wherein the composition comprises any suitable amount of the inorganic flame retardant or an amount of the inorganic flame retardant in any range disclosed herein, e.g., from about 80 wt. % to about 99 wt. %, from about 82 wt. % to about 95 wt. %, or from about 85 wt. % to about 95 wt. %, based on the total weight of the inorganic flame retardant and the flame retardant synergist.

Aspect 3. The flame retardant composition defined in aspect 1 or 2, wherein the inorganic flame retardant is not surface treated (or coated).

Aspect 4. The flame retardant composition defined in aspect 1 or 2, wherein the inorganic flame retardant comprises any suitable surface treatment (or coating) or any surface treatment (or coating) disclosed herein, e.g., a fluoropolymer, a fatty acid, a metallic fatty acid, a paraffin wax, a polyethylene wax, a polysiloxane, a polyalkylsiloxane, a polyorganosiloxane with a functional group, etc., or any combination thereof.

Aspect 5. The flame retardant composition defined in any one of the preceding aspects, wherein the inorganic flame retardant is characterized by any suitable median particle size (d50), or a median particle size (d50) in any range disclosed herein, e.g., from about 0.5 to about 10 µm, from about 0.5 to about 5 µm, or from about 1 to about 8 µm.

Aspect 6. The flame retardant composition defined in any one of the preceding aspects, wherein the inorganic flame retardant is characterized by any suitable BET surface area, or a BET surface area in any range disclosed herein, e.g., from about 1 to about 30 $m^2/g$, from about 1 to about 15 $m^2/g$, or from about 2 to about 20 $m^2/g$.

Aspect 7. The flame retardant composition defined in any one of aspects 1-6, wherein the inorganic flame retardant comprises aluminum trihydrate.

Aspect 8. The flame retardant composition defined in any one of aspects 1-6, wherein the inorganic flame retardant comprises magnesium hydroxide.

Aspect 9. The flame retardant composition defined in any one of the preceding aspects, wherein the composition comprises any suitable amount of the flame retardant synergist or an amount of the flame retardant synergist in any range disclosed herein, e.g., from about 1 wt. % to about 20 wt. %, from about 5 wt. % to about 20 wt. %, or from about 5 wt. % to about 15 wt. %, based on the total weight of the inorganic flame retardant and the flame retardant synergist.

Aspect 10. The flame retardant composition defined in any one of the preceding aspects, wherein the weight ratio of hydrotalcite:clay is any suitable weight ratio or a weight ratio in any range disclosed herein, e.g., from about 1:1 to about 25:1, from about 1:1 to about 20:1, or from about 2:1 to about 25:1.

Aspect 11. The flame retardant composition defined in any one of the preceding aspects, wherein the hydrotalcite comprises any suitable hydrotalcite or any hydrotalcite disclosed herein, e.g., a Mg/Al hydrotalcite, a Zn/Al hydrotalcite, a Mg/Zn/Al hydrotalcite, or organically modified derivatives thereof, etc., or any combination thereof.

Aspect 12. The flame retardant composition defined in any one of the preceding aspects, wherein the clay comprises any suitable clay or any clay disclosed herein, e.g., bentonite, montmorillite, hectorite, sepiolite, or modified derivatives thereof (e.g., modified with an ammonium salt), etc., or any combination thereof.

Aspect 13. A polymer composition (or formulation, or composite) comprising:

(a) a polymer; and
(b) the flame retardant composition defined in any one of the preceding aspects;
wherein the weight ratio of polymer:flame retardant composition is in a range from about 50:50 to about 25:75.

Aspect 14. The polymer composition defined in aspect 13, wherein the weight ratio of polymer:flame retardant composition is any suitable weight ratio or a weight ratio in any range disclosed herein, e.g., from about 50:50 to about 30:70, from about 45:55 to about 25:75, from about 40:60 to about 25:75, or from about 45:55 to about 35:65.

Aspect 15. The polymer composition defined in aspect 13 or 14, wherein the polymer comprises any suitable polymer, or any polymer disclosed herein, e.g., a thermoplastic, a thermoset, or a combination thereof.

Aspect 16. The polymer composition defined in aspect 13 or 14, wherein the polymer comprises an epoxy, an acrylic, an ester, a urethane, a silicone, a phenolic, etc., or a combination thereof.

Aspect 17. The polymer composition defined in aspect 13 or 14, wherein the polymer comprises a polyethylene (e.g., a homopolymer or ethylene-based copolymer), a polypropylene, a polybutylene terephthalate, an acrylonitrile butadiene styrene (ABS), a polyamide, a polyimide, a polystyrene, a polycarbonate, an ethylene-vinyl acetate (EVA) copolymer, a polyolefin-styrene, an ethylene acrylic elastomer (e.g., an ethylene-ethyl acrylate copolymer or an ethylene-methyl acrylate copolymer), an ethylene-propylene copolymer, an ethylene-propylene diene polymer, an ethylene-vinyl alcohol copolymer, etc., or a combination thereof.

Aspect 18. The polymer composition defined in aspect 13 or 14, wherein the polymer comprises a polyethylene (e.g., a homopolymer or ethylene-based copolymer), an ethylene-vinyl acetate (EVA) copolymer, or a combination thereof.

Aspect 19. The polymer composition defined in aspect 13 or 14, wherein the polymer comprises a rubber and/or an elastomer based upon a nitrile, a butadiene, isobutylene, isoprene, a styrene butadiene, etc., or a combination thereof.

Aspect 20. The polymer composition defined in any one of aspects 13-19, wherein the polymer composition has a time to ignition (TTI) that is greater than that of a polymer composition prepared using the same flame retardant composition without the clay and/or greater than that of a polymer composition prepared using the same flame retardant composition without the hydrotalcite, under the same processing conditions.

Aspect 21. The polymer composition defined in any one of aspects 13-20, wherein the polymer composition has a peak heat release rate (PHRR) that is less than that of a polymer composition prepared using the same flame retardant composition without the clay and/or less than that of a polymer composition prepared using the same flame retardant composition without the hydrotalcite, under the same processing conditions.

Aspect 22. The polymer composition defined in any one of aspects 13-21, wherein the polymer composition has a total heat release (THR) that is less than that of a polymer composition prepared using the same flame retardant composition without the clay and/or less than that of a polymer composition prepared using the same flame retardant composition without the hydrotalcite, under the same processing conditions.

Aspect 23. The polymer composition defined in any one of aspects 13-22, wherein the polymer composition has a maximum average rate of heat evolved (MARHE) that is less than that of a polymer composition prepared using the same flame retardant composition without the clay and/or less than that of a polymer composition prepared using the same flame retardant composition without the hydrotalcite, under the same processing conditions.

Aspect 24. The polymer composition defined in any one of aspects 13-23, wherein the polymer composition has a fire growth rate index (FIGRA) that is less than that of a polymer composition prepared using the same flame retardant composition without the clay and/or less than that of a polymer composition prepared using the same flame retardant composition without the hydrotalcite, under the same processing conditions.

Aspect 25. The polymer composition defined in any one of aspects 13-24, wherein the polymer composition has a fire performance index (FPI) that is greater than that of a polymer composition prepared using the same flame retardant composition without the clay and/or greater than that of a polymer composition prepared using the same flame retardant composition without the hydrotalcite, under the same processing conditions.

Aspect 26. The polymer composition defined in any one of aspects 13-25, wherein the polymer composition passes an Underwriters Laboratories UL-94 test with a V0 rating.

Aspect 27. The polymer composition defined in any one of aspects 13-26, wherein the polymer composition has a water uptake that is less than that of a polymer composition prepared using the same flame retardant composition without the clay and/or less than that of a polymer composition prepared using the same flame retardant composition without the hydrotalcite, under the same processing conditions.

Aspect 28. The polymer composition defined in any one of aspects 13-27, wherein the polymer composition has any suitable water uptake or a water uptake in any range disclosed herein, e.g., less than or equal to about 1.3 wt. %, less than or equal to about 1.1 wt. %, less than or equal to about 1 wt. %, or less than or equal to about 0.9 wt. %.

Aspect 29. The polymer composition defined in any one of aspects 13-28, wherein the polymer composition has an electrical resistivity that is greater than that of a polymer composition prepared using the same flame retardant composition without the clay and/or greater than that of a polymer composition prepared using the same flame retardant composition without the hydrotalcite, under the same processing conditions.

Aspect 30. The polymer composition defined in any one of aspects 13-29, wherein the polymer composition has a viscosity that is less than that of a polymer composition prepared using the same flame retardant composition without the clay and/or less than that of a polymer composition prepared using the same flame retardant composition without the hydrotalcite, under the same processing conditions.

Aspect 31. The polymer composition defined in any one of aspects 13-30, wherein the polymer composition has an elongation at break that is greater than that of a polymer composition prepared using the same flame retardant composition without the clay and/or greater than that of a polymer composition prepared using the same flame retardant composition without the hydrotalcite, under the same processing conditions.

Aspect 32. The polymer composition defined in any one of aspects 13-31, wherein the polymer composition has a tensile strength at break that is greater than that of a polymer composition prepared using the same flame retardant composition without the clay and/or greater than that of a polymer composition prepared using the same flame retardant composition without the hydrotalcite, under the same processing conditions.

Aspect 33. An article of manufacture comprising the polymer composition defined in any one of aspects 13-32.

Aspect 34. The article defined in aspect 33, wherein the article comprises a gel, paste, coating, or foam.

Aspect 35. The article defined in aspect 33, wherein the article comprises a sheet or film.

Aspect 36. The article defined in aspect 33, wherein the article comprises a wire or cable.

We claim:
1. A flame retardant composition comprising:
   (i) from about 75 wt. % to about 99.5 wt. % of an inorganic flame retardant comprising aluminum trihydrate and/or magnesium hydroxide; and
   (ii) from about 0.5 wt. % to about 25 wt. % of a flame retardant synergist comprising:
      (a) a hydrotalcite, wherein the hydrotalcite comprises a Mg/Al hydrotalcite, a Zn/Al hydrotalcite, a Mg/Zn/Al hydrotalcite, or organically modified derivatives thereof, or any combination thereof; and
      (b) a clay, wherein the clay comprises bentonite, montmorillite, hectorite, sepiolite, or modified derivatives thereof, or any combination thereof;
   wherein the weight ratio of hydrotalcite:clay is in a range from about 1:1 to about 100:1.

2. The flame retardant composition of claim 1, wherein the composition contains from about 82 wt. % to about 95 wt. % of the inorganic flame retardant, based on the total weight of the inorganic flame retardant and the flame retardant synergist.

3. The flame retardant composition of claim 1, wherein the inorganic flame retardant comprises a surface treatment.

4. The flame retardant composition of claim 1, wherein the inorganic flame retardant comprises aluminum trihydrate.

5. The flame retardant composition of claim 1, wherein the inorganic flame retardant comprises magnesium hydroxide.

6. The flame retardant composition of claim 1, wherein the composition contains from about 5 wt. % to about 15 wt. % of the flame retardant synergist, based on the total weight of the inorganic flame retardant and the flame retardant synergist.

7. The flame retardant composition of claim 1, wherein the weight ratio of hydrotalcite:clay is in a range from about 1:1 to about 20:1.

8. The flame retardant composition of claim 1, wherein the weight ratio of hydrotalcite:clay is in a range from about 2:1 to about 25:1.

9. A polymer composition comprising:
   (a) a polymer; and
   (b) the flame retardant composition of claim 1.

10. The polymer composition of claim 9, wherein the polymer comprises a thermoplastic polymer.

11. The polymer composition of claim 9, wherein the polymer comprises an ethylene homopolymer, an ethylene/α-olefin copolymer, an ethylene/vinyl acetate (EVA) copolymer, or any combination thereof.

12. The polymer composition of claim 9, wherein the weight ratio of polymer:flame retardant composition is in a range from about 50:50 to about 25:75.

13. The polymer composition of claim 9, wherein the weight ratio of polymer:flame retardant composition is in a range from about 45:55 to about 30:70.

14. The polymer composition of claim 9, wherein the polymer composition has a water uptake of less than or equal to about 1.1 wt. %.

15. The polymer composition of claim 9, wherein the polymer composition passes an Underwriters Laboratories UL-94 test with a V0 rating.

16. The polymer composition of claim 9, wherein:
the polymer composition has a fire performance index (FPI) that is greater than that of a polymer composition prepared using the same flame retardant composition without the clay and greater than that of a polymer composition prepared using the same flame retardant composition without the hydrotalcite, under the same processing conditions;
the polymer composition passes an Underwriters Laboratories UL-94 test with a V0 rating;
the polymer composition has a water uptake that is less than that of a polymer composition prepared using the same flame retardant composition without the hydrotalcite, under the same processing conditions; and
the polymer composition has a viscosity that is less than that of a polymer composition prepared using the same flame retardant composition without the hydrotalcite, under the same processing conditions.

17. The polymer composition of claim 16, wherein:
the polymer composition has an elongation at break that is greater than that of a polymer composition prepared using the same flame retardant composition without the hydrotalcite, under the same processing conditions; and
the polymer composition has a tensile strength at break that is greater than that of a polymer composition prepared using the same flame retardant composition without the hydrotalcite, under the same processing conditions.

18. An article of manufacture comprising the polymer composition of claim 9.

19. A flame retardant composition comprising:
(i) from about 85 wt. % to about 95 wt. % of an inorganic flame retardant comprising aluminum trihydrate; and
(ii) from about 5 wt. % to about 15 wt. % of a flame retardant synergist comprising:
(a) a hydrotalcite, wherein the hydrotalcite comprises a Mg/Al hydrotalcite, a Zn/Al hydrotalcite, a Mg/Zn/Al hydrotalcite, or organically modified derivatives thereof, or any combination thereof; and
(b) a clay, wherein the clay comprises bentonite, montmorillite, hectorite, sepiolite, or modified derivatives thereof, or any combination thereof;
wherein the weight ratio of hydrotalcite:clay is in a range from about 1:1 to about 25:1.

20. A polymer composition comprising:
(a) a polymer comprising an ethylene homopolymer, an ethylene/α-olefin copolymer, an ethylene/vinyl acetate (EVA) copolymer, or any combination thereof; and
(b) the flame retardant composition of claim 19.

21. The polymer composition of claim 20, wherein the weight ratio of polymer:flame retardant composition is in a range from about 50:50 to about 25:75.

22. The polymer composition of claim 21, wherein:
the polymer composition has a water uptake of less than or equal to about 1.3 wt. %; and
the polymer composition passes an Underwriters Laboratories UL-94 test with a V0 rating.

23. An article of manufacture comprising the polymer composition of claim 21.

* * * * *